US010986197B2

(12) United States Patent
Nagao

(10) Patent No.: US 10,986,197 B2
(45) Date of Patent: Apr. 20, 2021

(54) CONTENT DISTRIBUTION SYSTEMS AND METHODS

(71) Applicant: Intertrust Technologies Corporation, Sunnyvale, CA (US)

(72) Inventor: Yutaka Nagao, San Jose, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 16/590,208

(22) Filed: Oct. 1, 2019

(65) Prior Publication Data

US 2020/0106845 A1 Apr. 2, 2020

Related U.S. Application Data

(60) Provisional application No. 62/740,116, filed on Oct. 2, 2018.

(51) Int. Cl.
*H04L 29/08* (2006.01)
*H04W 88/02* (2009.01)

(52) U.S. Cl.
CPC ............. *H04L 67/22* (2013.01); *H04L 67/06* (2013.01); *H04L 67/306* (2013.01); *H04W 88/02* (2013.01)

(58) Field of Classification Search
CPC ..... H04L 67/06; H04L 67/22; H04L 67/2847; H04L 67/306; H04W 88/02
See application file for complete search history.

(56) References Cited

U.S. PATENT DOCUMENTS

| 5,802,292 | A | 9/1998 | Mogul |
|---|---|---|---|
| 7,551,913 | B1 | 6/2009 | Chien |
| 7,957,691 | B1 | 6/2011 | Lee |
| 9,948,742 | B1 | 4/2018 | Bueche et al. |
| 10,038,927 | B2 | 7/2018 | Shatzkamer |
| 2006/0277271 | A1 | 12/2006 | Morse et al. |
| 2008/0134043 | A1 | 6/2008 | Georgis et al. |
| 2008/0139112 | A1 | 6/2008 | Sampath et al. |
| 2009/0279468 | A1* | 11/2009 | Kenagy ............... H04H 20/26 370/312 |
| 2010/0205148 | A1 | 8/2010 | Leblanc et al. |
| 2014/0059156 | A1 | 2/2014 | Freeman, II et al. |
| 2014/0214878 | A1 | 7/2014 | Morse et al. |

(Continued)

OTHER PUBLICATIONS

"Predictive Content Delivery for Mobile Video SDK." Akamai, Cambridge, Mass. Published Apr. 2016.

*Primary Examiner* — June Y Sison
(74) *Attorney, Agent, or Firm* — John P. Davis; Thayne and Davis LLC

(57) ABSTRACT

This disclosure relates to systems and methods for distributing content to a mobile device. Systems and methods are described that provide techniques for the dynamic selection of content for distribution to a mobile device based on user profile information and/or feedback information associated with a user of the mobile device. Additional embodiments of the disclosed systems and methods may provide for the pre-distribution of certain shared content portions to a mobile device. In further embodiments, information relating to the rendering of content items from a set of serialized and/or episodic content items on a mobile device may be used to determine whether to pre-distribute other content items from the set of content items.

18 Claims, 7 Drawing Sheets

(56) References Cited

U.S. PATENT DOCUMENTS

| | | | |
|---|---|---|---|
| 2014/0229609 A1* | 8/2014 | Wong | H04L 67/2842 |
| | | | 709/224 |
| 2014/0282636 A1 | 9/2014 | Petander et al. | |
| 2016/0191664 A1 | 6/2016 | Balakrishnan et al. | |
| 2018/0240211 A1* | 8/2018 | Chatterjee | G06Q 30/0261 |
| 2018/0343475 A1 | 11/2018 | Park et al. | |
| 2020/0073517 A1* | 3/2020 | Cai | G06F 9/451 |
| 2020/0296451 A1* | 9/2020 | Hassler | H04N 21/437 |

* cited by examiner

CONTENT DISTRIBUTION SYSTEMS AND METHODS

RELATED APPLICATIONS

This application claims the benefit of priority under 35 U.S.C. § 119(e) to U.S. Provisional Patent Application No. 62/740,116, filed. Oct. 2, 2018, and entitled "Content Distribution Systems and Methods," which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for distributing content to mobile devices. More specifically, but not exclusively, the present disclosure relates to systems and methods for distributing content to mobile devices for caching and offline consumption.

Mobile devices, including mobile phones, tablets, electronic books, computers, and/or the like are increasingly being used for content consumption. For example, a smartphone may be used by a user to consume video (e.g., movie, television, etc.), audio, text, and/or multi-media content. Similarly, an electronic book may be used to consume text content including books, magazines, and/or newspaper articles.

Many mobile devices are not persistently connected to the Internet and/or other networks that facilitate the distribution of content to the devices from one or more content systems and/or services. For example, an Internet connection may not necessarily be stable and/or available to a mobile device located in more remote environments including, for example, mountainous environments, rural environments, developing countries with sporadic data connectivity coverage, environments at sea and/or while flying in an aircraft, and/or the like. Limited connectivity may make it difficult for a user to interact with a variety of different content items, and may require a user to know beforehand what content they would like to consume in areas of limited connectivity and download such content in advance from a content service and/or system.

Systems and methods disclosed herein may provide for the dynamic selection of content for distribution to a mobile device based on user profile information associated with a user of the mobile device. In certain embodiments, the user profile information may indicate and/or be used to infer various interests associated with the user. Based on the indicated and/or inferred interests, a plurality of content items may be selected for distribution to the mobile device when the mobile device has network connectivity and/or threshold levels of connectivity. Content received by the mobile device may be cached and/or otherwise stored and provided to a user for consumption when the mobile device has limited network connectivity. In certain embodiments, the selection of content for distribution may be further based on one or more user preferences relating to caching and/or pre-distribution of content (e.g., preferences relating to content types, quality and/or fidelity, number of content titles, and/or the like).

Systems and methods disclosed herein may further identify portions of content that are shared with other content items. For example, different movie content items may share one or more one or more advertisement, copyright warnings, pre-roll, mid-content, and/or appended content portions, and/or the like. Consistent with embodiments disclosed herein, the one or more shared content portions may be distributed to a mobile device for rendering in connection with associated content items. In this manner, content portions shared between multiple content items may be pre-cached and/or otherwise stored by a mobile device, thereby improving bandwidth utilization and/or content download times.

In further embodiments, feedback information relating to the rendering of content items from a set of serialized and/or episodic content items on a mobile device may be used to determine whether to pre-distribute other content items from the set of content items. In some embodiments, thresholds used to determine whether to pre-distribute other content items may vary based, at least in part, on a duration that the user views one or more content items in the set of content items and/or a relative position of a viewed content item relative to the serialized and/or episodic set of content items.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
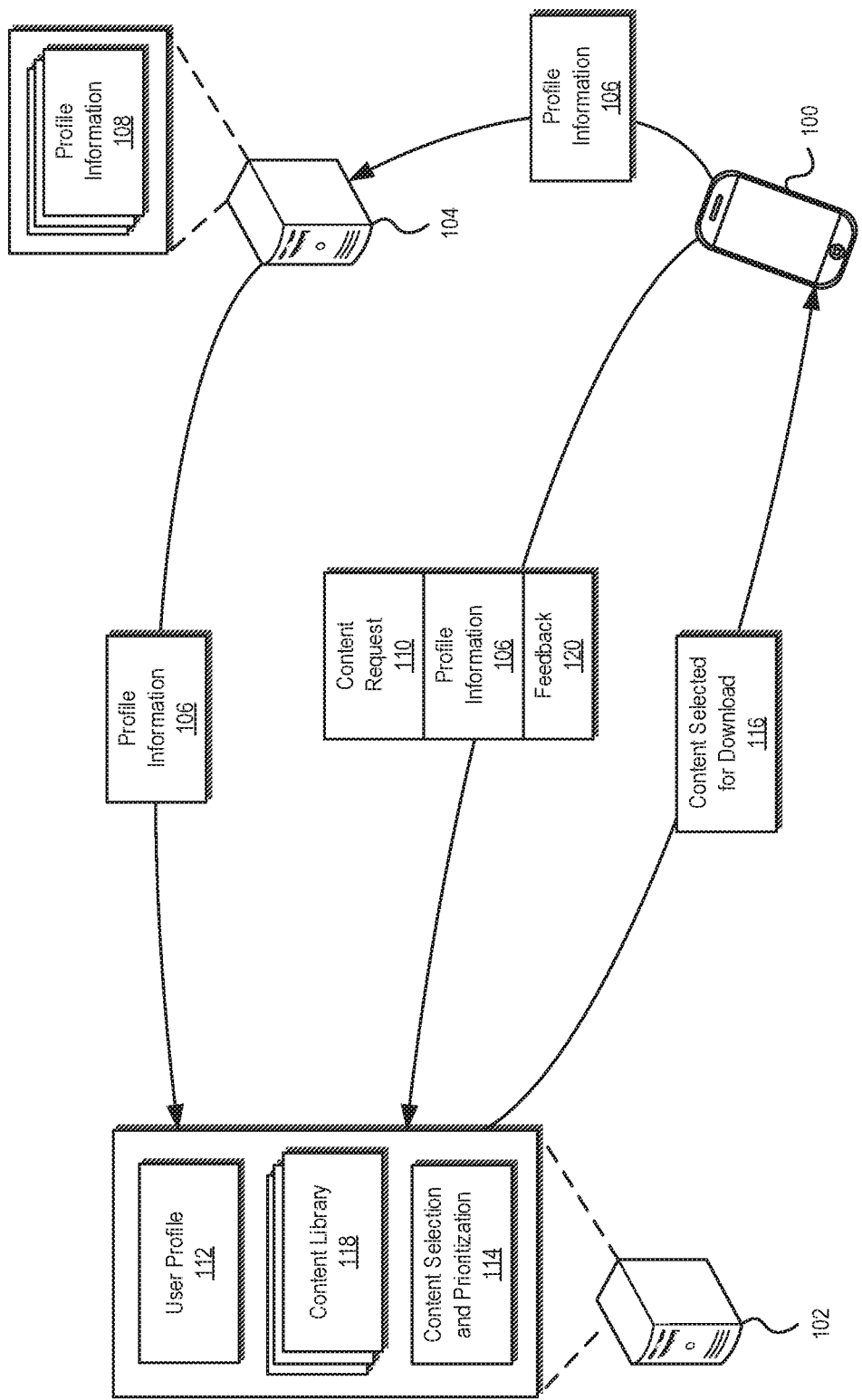
FIG. 1 illustrates an example of content distribution consistent with certain embodiments of the present disclosure.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may in some instances be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure but is merely representative of possible embodiments of the disclosure. In addition, the steps of any method disclosed herein do not necessarily need to be executed in any specific order, or even sequentially, nor need the steps be executed only once, unless otherwise specified.

As users interact with personal electronic devices, including mobile electronic devices, the Internet, and other connected services (e.g., content services), various information relating to the users may be collected. In certain embodiments, such information may be directly provided by a user (e.g., as part of a device and/or service registration process). In further embodiments, information may be obtained by monitoring a user's interaction with devices and/or services (e.g., sensor information, usage information, etc.). Collected information may identify and/or otherwise infer a variety of information relating to a user. For example, information may be collected related to a user that may identify and/or be used to infer a user's gender, age, ethnicity, residence, place of employment and/or occupation, salary, content interests, relationship status, and/or the like. Such information may be included in a profile associated with a user and, in certain instances, may be generally referred to herein as profile and/or user profile information.

User profile information may be used in connection with various aspects of the disclosed embodiments to select a plurality of content items for distribution to a mobile device during periods when the mobile device has network connectivity. In various embodiments, user profile information may be used to determine which content items from a content library should be distributed to the mobile device by a content service. For example, user profile information may be used to identify and distribute content items from a content library that may be of interest to the user as indicated by the user profile information. Distributed content items may be cached and/or stored by the mobile device. In this manner, a number of content items potentially of interest to a user may be made available to a user of a mobile device when the mobile device has limited network connectivity.

FIG. 1 illustrates an example of content distribution consistent with certain embodiments of the present disclosure. In certain embodiments, a mobile device 100 may interact with a content service 102 and/or one or more other systems and/or services (e.g., a user information service 104) in connection with various aspects of the disclosed embodiments. In certain embodiments, the device 100 may comprise at least one of a smartphone, an electronic book, a smartwatch, a laptop computer system, a desktop computer system, a wearable personal electronic device, a tablet computer, and/or any other computing system and/or mobile device that may be used in connection with the disclosed systems and methods. Although embodiments disclosed herein are described in reference to a mobile device 100, further embodiments may be used in connection with devices that are not necessarily mobile and/or otherwise portable. In various embodiments, the device 100 may be configured interact with a content service 102 in connection with the distribution of content items to the device 100 and/or a user information service 104 in connection with the collection and/or aggregation of various user profile information related to the device 100 and/or its user.

It will be appreciated that a variety of content items may be used in connection with various embodiments of the disclosed systems and methods including, for example and without limitation, video content (e.g., television shows, movies, etc.), audio content (e.g., podcasts, radio shows, music, etc.), multi-media content, text content (e.g., books, magazines, etc.), and/or combinations of the same. Moreover, as discussed below, in some embodiments, certain content may be serialized, sequenced, and/or otherwise episodic.

The mobile device 100, content service 102, user information service 104, and/or one or more other associated systems and/or services may comprise at least one processor. The processor may be configured to implement a variety of device functions including, for example, executing applications, coordinating certain services, and/or the like. In some embodiments, the devices, systems, and/or associated processors may further include a secure processing unit ("SPU"), a hardened and/or secure execution space, and/or a trusted execution environment ("TEE") with sufficient trusted and/or secure resources to implement certain more secure functions associated with content distribution and/or user profile information management.

The mobile device 100, content service 102, user information service 104, and/or one or more other associated systems and/or services may comprise a variety of types of computing systems, combinations of systems, and/or other associated equipment (e.g., network infrastructure equipment and/or the like). For example, the mobile device 100, content service 102, user information service 104, and/or one or more other associated systems and/or services may comprise any suitable computing system and/or combination of systems configured to implement embodiments of the systems and methods disclosed herein. In certain embodiments, the mobile device 100, content service 102, user information service 104, and/or one or more other associated systems and/or services may comprise at least one processor system configured to execute instructions stored on an associated non-transitory computer-readable storage medium. The mobile device 100, content service 102, user information service 104, and/or one or more other associated systems and/or services may further comprise software and/or hardware configured to enable electronic communication of information between the devices and/or systems 100-104 via one or more associated network connections.

The mobile device 100, content service 102, user information service 104, and/or one or more other associated systems and/or services may communicate using a network comprising any suitable number of networks and/or network connections. The network connections may comprise a variety of network communication devices and/or channels and may use any suitable communication protocols and/or standards facilitating communication between the connected devices and/or systems 100-104. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth ultra-wide band ("UWB"), Zigbee®, and or any other suitable communication protocol(s).

Systems and methods disclosed herein may relate to the dynamic selection of content for distribution to a mobile device 100 based on user profile information 112 associated with a user of the mobile device 100 when the mobile device 100 has network connectivity. In this manner, a number of content items potentially of interest to a user may be made available to a user of a mobile device 100 at a later time when the mobile device 100 has limited network connectivity. In certain embodiments, content may be selected for distribution to the mobile device 100 without the user having to directly select which content from a content library 118 they would like to download to their device 100.

Consistent with various aspects of the disclosed embodiments, user profile information 106, including any of the types of user profile information described herein, may be used in connection with various aspects of the disclosed embodiments to select a plurality of content items for distribution to a mobile device 100 during periods when the mobile device 100 has network connectivity. In some embodiments, the content service 102 may receive user profile information 106 from the mobile device 100. In further embodiments, the content service 102 may receive user profile information 106 from a user information service 104. In certain embodiments, the user information service 104 may collect user profile information associated with a plurality of users and/or aggregate user profile information from multiple devices and/or sources associated with a user. For example, the user information service 104 may receive and aggregate user profile information from the mobile device 100 and/or one or more other systems and/or services and distribute the profile information 106 to the content service 102.

In certain embodiments, the profile information 106 may be provided to the content service 102 (e.g., provided by the mobile device 100 and/or the user information service 104) automatically and/or periodically. For example, when new user profile information 106 is generated by the mobile device 100 and/or received by the user information service 104, the new profile information 106 may be automatically provided to the content service 102. Similarly, new profile information 106 may be provided to the content service 102 via periodic updates from the mobile device 100 and/or the user information service 104.

In some embodiments, the profile information 106 may be provided to the content service 102 in connection with a request 110 for content provisioning issued by the mobile device 100. In certain embodiments, the request 110 may be in response to an explicit user request for content received by the mobile device 100. In further embodiments, the request 110 may be generated by the mobile device 100 and transmitted to the content service 102 based on the mobile device 100 determining that it has network connectivity and/or network connectivity meeting certain threshold criteria (e.g., bandwidth requirements and/or the like) that enables to the device 100 to download content from the content service 102.

In various embodiments, the mobile device 100 may transmit identifying information to the content service 102. In some embodiments, the identifying information may be transmitted either separate from or in connection with the content request 110. For example, the mobile device 100 may transmit a unique device identifier ("UDID"), a home address, an Internet Protocol ("IP") address, and/or any other suitable information that may identify the device 100 and/or an associated user.

Using the identifying information, the content service 102 may retrieve associated user profile information 106 from the user information service 104. User profile information 106 received from the device 100 and/or the user information service 104 and/or other devices and/or services associated with the user may be aggregated by the content service as part of a user profile 112 associated with the user. For example, the content service 102 may issue a request to the user information service 104 for user profile information 106 associated with the identifying information. In certain embodiments, the user profile information 106 received from the user information service 104 may directly indicate various interests associated with the user of the mobile device 100. In further embodiments, the user profile information 106 may include information that may be used by the content service 102 to infer interests associated with the user.

Consistent with the disclosed embodiments, a content selection and/or prioritization module 114 executing on the content service 102 may select one or more content items 116 from a content library 118 managed by the content service 102 based on the user's interests for distribution to the mobile device 100 while the mobile device 100 has network connectivity. In certain embodiments, which content 116 from the content library 118 is selected for distribution may be further based on one or more preferences and/or other criteria that, in certain instances, may be specified by a user of the device 100. For example, content 116 may be selected for distribution based on identified user interests and one or more user preferences and/or criteria relating to the caching and/or pre-distribution of content. Such preferences may include, for example, preferences relating to content types, quality and/or fidelity, a number of content titles, priorities of content titles and/or interests, and/or the like. For example, preferences and/or criteria may articulate that the content service 102 should select a number of content items of a relatively low video quality and/or resolution without supplementary content (e.g., language and/or audio subtitles, director comments, bonus tracks, etc.) so that the content service 102 can provision the mobile device 100 with as many content items 116 as possible when the mobile device 100 has network connectivity.

In some embodiments, the content service 102 may rank content identified in the content library 118 based on a degree to which the content satisfies the identified user interests and/or one or more user preferences and/or criteria. Content may be queued for distribution to the mobile device 100 from the content service 102 based, at least in part, the associated ranking. In this manner, content that better matches user interests, preferences, and/or criteria may be prioritized for distribution to the mobile device 100 during periods where the mobile device 100 has network connectivity.

In at least one example, user profile information 112 may indicate and/or be used to infer a user of the mobile device 100 is a Japanese citizen, male, 20-30 years old, a fan of baseball and hockey, is a beginning speaker of English, and has a home address in San Francisco. Consistent with various aspects of the disclosed embodiments, the content system 102 may thus select and prioritize the distribution of San Francisco Giants baseball game videos to the mobile device 100. After distributing the selected San Francisco Giants baseball game videos, the content service 102 may select and distribute Oakland A's baseball game videos to the mobile device 100. Finally, after distributing the selected Oakland A's baseball game videos, the content service 102 may select and distribute San Jose Sharks hockey game videos. In various embodiments, consistent with one or more user preferences and/or criteria, content 116 selected for distribution to the device 100 may be of a relatively low quality and/or not be associated with supplementary content so that the content service 102 may distribute as many content items as possible when the mobile device 100 has network connectivity.

Content received by the mobile device 100 from the content service 102 may be cached and/or otherwise stored and provided to a user for consumption when the mobile device 100 has limited network connectivity. In this manner, if the device 100 loses network connectivity, a user of the mobile device 100 may select from a relatively large number of cached content items for consumption. For instance, in the above example, the user may watch two baseball games and one hockey game, albeit in lower quality formats. In some embodiments, without prioritizing content distribution consistent with various aspects of the disclosed embodiments, the mobile device 100 may only be able to download half of a single baseball game in a higher quality format. Accordingly, various embodiments disclosed herein may prioritize the distribution of a larger number of content items to a mobile device 100 over content quality to provide users with a better content selection options during periods of limited or no network connectivity.

In some embodiments, feedback information 120 may be received from the mobile device 100 relating to the content items distributed by the content service 102. For example, the content service 102 may receive an indication from the mobile device 100 as to which content the user has consumed, which content the user is in the process of consuming, direct feedback relating to the distributed content, and/or the like. Based on the feedback, the content service 102 may identify further content items for distribution to the mobile device 100 during periods of network connectivity. For example, if feedback 120 received from the device 100 indicates that a user has started to watch a baseball game in a relatively low-quality format, the content service 102 may distribute to the device 100 the remainder of the baseball game in a relatively higher quality format.

It will be appreciated that a number of variations can be made to the architecture, relationships, and examples presented in connection with FIG. 1 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 1 are provided for purposes of illustration and explanation, and not limitation.

Figure 2:
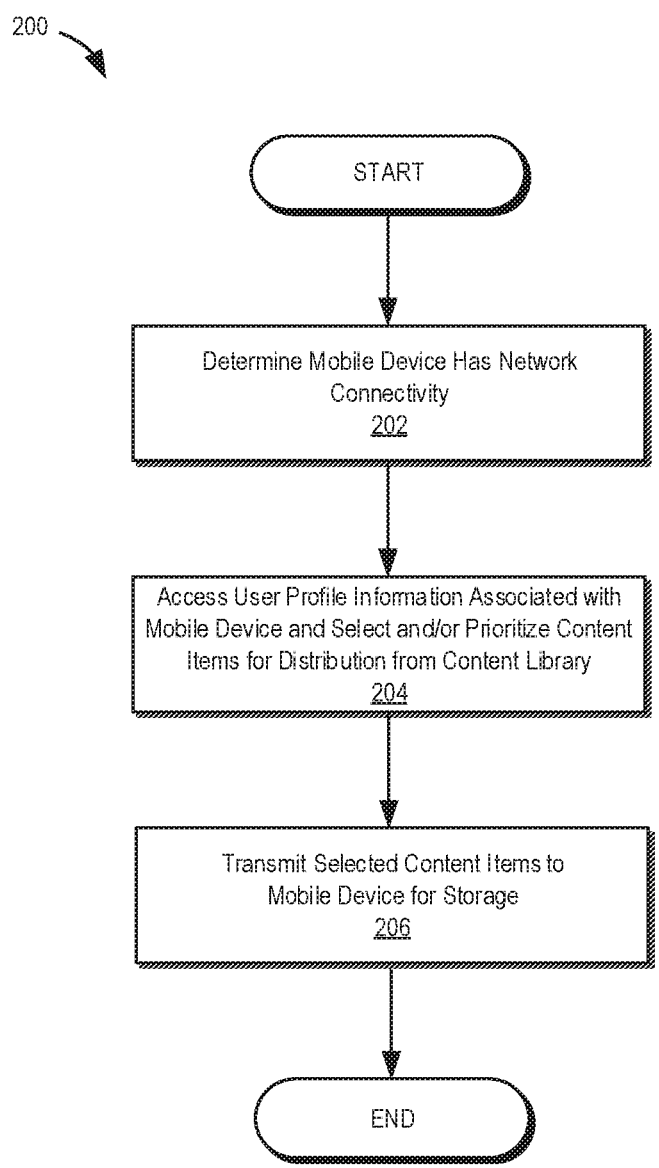
FIG. 2 illustrates a flow chart of an example of a method for distributing content to a mobile device consistent with certain embodiments of the present disclosure.

FIG. 2 illustrates a flow chart of an example of a method 200 for distributing content to a mobile device consistent with certain embodiments of the present disclosure. The illustrated method 200 may be implemented in a variety of ways, including using software, firmware, and/or any combination thereof. In certain embodiments, various aspects of the illustrated method 200 and/or its one or more of its constituent steps may be performed by a content service, a user information service, a mobile device, and/or any suitable combination of one or more services and/or computer systems.

The method 200 may begin by determining whether the mobile device has network connectivity (e.g., connectivity to a content service) at 202. In some embodiments, this may be determined based on receipt of a request for content provisioning issued by the mobile device. The request may be generated in response to an explicit user request for content and/or automatically generated based on the mobile device determining it has network connectivity and/or network connectivity meeting certain threshold criteria that enables to the device to download content from the content service.

Profile information associated with the user of the mobile device may be accessed at 204. In certain embodiments, the profile information may be received from the mobile device directly. In further embodiments, the profile information may be retrieved from a user information service. For example, the profile information may be retrieved from a user information service based on information identifying the mobile device and/or an associated user included in a content request received from the device.

Based on the user profile information and/or other information that may be inferred therefrom (e.g., interests), content items may be selected for distribution to the mobile device from a content library. In certain embodiments, which content items from the content library are selected for distribution may be further based on one or more preferences and/or other criteria that, in certain instances, may be specified by a user of the device and/or may relate to the caching and/or pre-distribution of content.

Selected content items may be distributed to the mobile device at 206. In certain embodiments, the content items may be distributed to the mobile device in accordance with a ranking associated with the content items. For example, in some embodiments, the content service may rank content identified in the content library based on a degree to which the content satisfies the identified user interests, and/or one or more user preferences and/or criteria, and content may be queued for distribution to the mobile device from the content service based, at least in part, the associated ranking.

Figure 3:
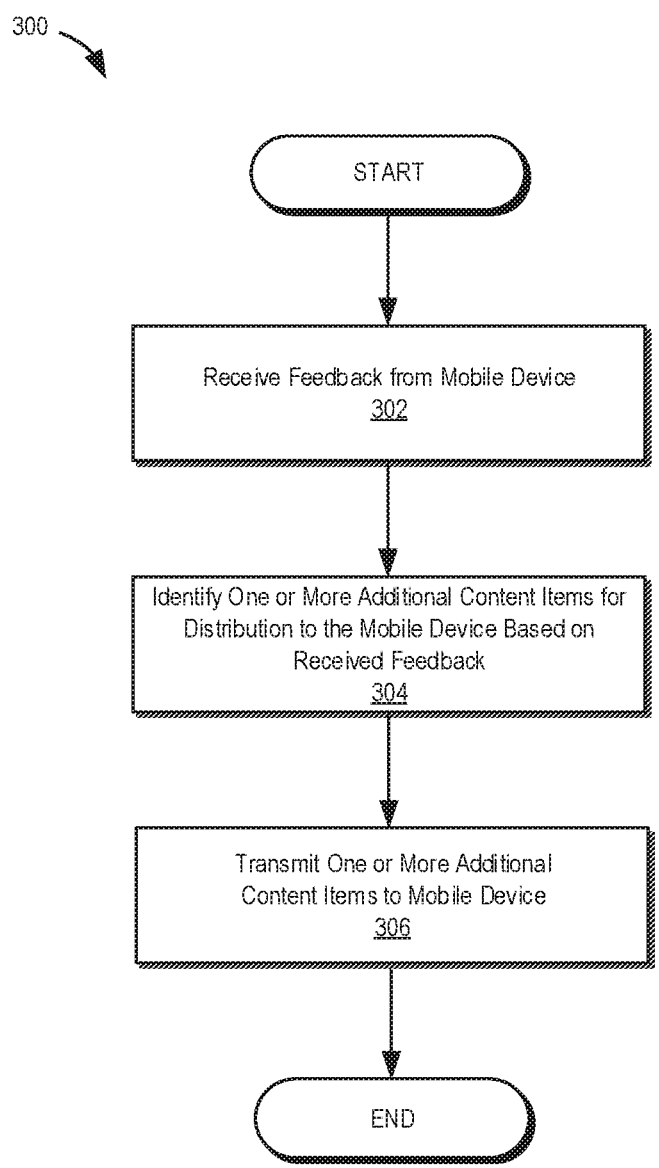
FIG. 3 illustrates a flow chart of an example of a method for distributing additional content to a mobile device based on received feedback information consistent with certain embodiments of the present disclosure.

FIG. 3 illustrates a flow chart of an example of a method 300 for distributing additional content to a mobile device based on received feedback information consistent with certain embodiments of the present disclosure. The illustrated method 300 may be implemented in a variety of ways, including using software, firmware, and/or any combination thereof. In certain embodiments, various aspects of the illustrated method 300 and/or its one or more of its constituent steps may be performed by a content service, a user information service, a mobile device, and/or any suitable combination of one or more services and/or computer systems.

In some embodiments, feedback may be received from the mobile device at 302 relating to content items distributed to the mobile device by the content service. For example, the content service may receive an indication from the mobile device indicating which content the user has consumed, which content the user is in the process of consuming, direct feedback relating to the distributed content from the user, and/or the like. Based on the feedback, the content service may identify at 304 additional content items and/or upgraded content items for distribution to the mobile device during periods of network connectivity. For example, if feedback received from the device indicates that a user has started to watch a baseball game in a relatively low-quality format, the content service may distribute to the device the remainder of the baseball game in a relatively higher quality format.

In at least one non-limiting example, the content service may identify, based on the received feedback, a recently watched but unfinished video content item, and may transmit to the device during a period of network connectivity upgraded video content. For example, in connection with the example user described above, the content service may add Japanese subtitles and/or audio and replace lower quality video content of a baseball game the user has started to view with a higher quality version of the remaining unwatched content. In some embodiments, upgraded content may be transmitted in one or more segments. In this manner, if the mobile device loses network connectivity before the entirety of the upgraded content is distributed, the user may still watch at least a portion of the upgraded content.

The content service may further communicate with the user information service to identify any updates to previously received user profile information. In some embodiments, the content service may provide the user information service with feedback information received from the device (e.g., video consumption history and/or the like) that may be used to update and/or otherwise improve associated user profile information. Based on the updated user profile information, the content service may select and/or otherwise prioritize new content titles from the content library for distribution to the mobile device.

In some embodiments, the new content titles distributed to the mobile device may be of relatively low-quality and/or not include supplementary content (e.g., subtitles, multiple language audio tracks, director comments, etc.) to prioritize the distribution of as many content titles as possible while the device has network connectivity. If all selected content titles are distributed and the mobile device remains connected, the content service may update and/or otherwise upgrade distributed content titles with higher quality versions and/or versions with supplementary content. In certain embodiments, updating and/or upgrading content may proceed in accordance the ranking of the associated content by the content service.

Figure 4:
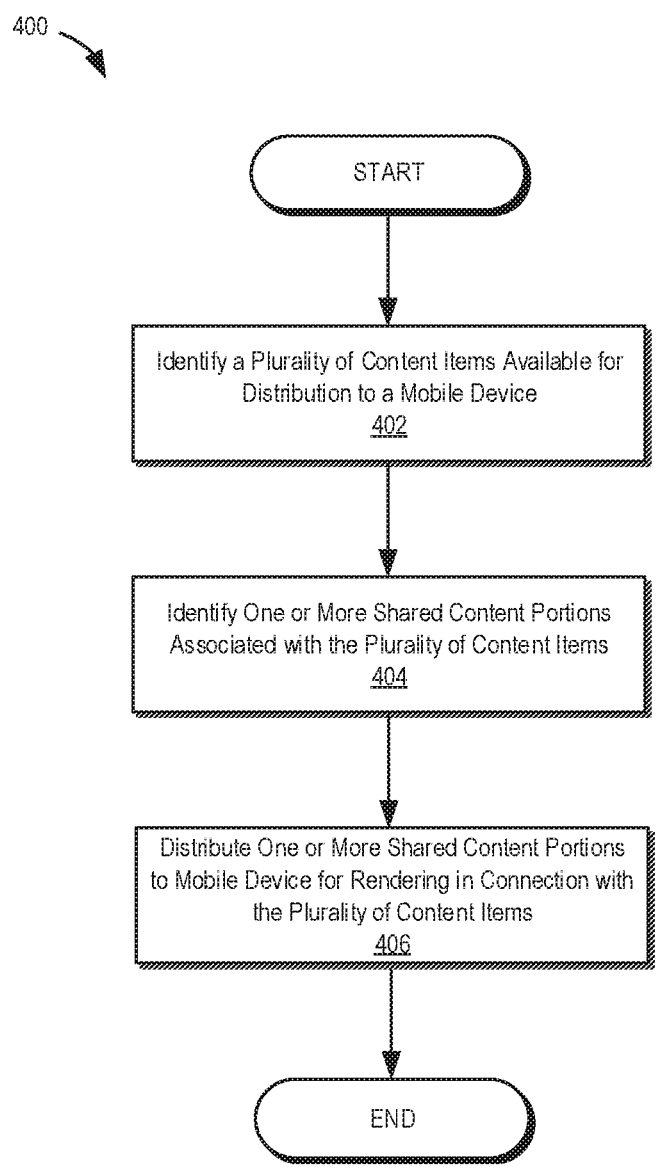
FIG. 4 illustrates a flow chart of an example of a method for distributing shared content portions to a mobile device consistent with certain embodiments of the present disclosure.

FIG. 4 illustrates a flow chart of an example of a method 400 for distributing content portions to a mobile device consistent with certain embodiments of the present disclosure. The illustrated method 400 may be implemented in a variety of ways, including using software, firmware, and/or any combination thereof. In certain embodiments, various aspects of the illustrated method 400 and/or its one or more of its constituent steps may be performed by a content service, a user information service, a mobile device, and/or any suitable combination of one or more services and/or computer systems.

One or more content items may be identified for distribution and/or otherwise be made available for distribution (e.g., distribution via download, streaming, and/or the like) to a mobile device at 402. For example, one or more content items may be identified for distribution to the mobile device from a content library managed by a content service. In some embodiments, the one or more content items may be identified based, at least in part, on user profile information and/or other information that may be inferred therefrom (e.g., interests).

Certain content items may comprise one or more shared portions. In some embodiments, different movie content items may share one or more one or more pre-roll, mid-content, and/or appended content portions. For example, content items may include one or more shared pre-roll trailers, studio and/or production company introductions, copyright notices and/or infringement warnings, and/or the like. In further embodiments, content items may include one or more portions that comprise shared advertisements. It will be appreciated that a variety of content portions may be shared between content items, and that any examples of shared content portions described herein are not to be viewed as limiting.

Consistent with aspects of the disclosed embodiments, one or more shared content portions associated with the plurality of content items identified at 402 may be identified at 404. The one or more shared content portions may be identified using a variety of methods. For example, in some embodiments, metadata associated with the content items and/or the shared content portions may be used to identify the shared content portions. In further embodiments, the plurality of content items may be compared and analyzed to match shared portions and/or otherwise identify shared portions.

At 406, the one or more shared content portions identified at 404 may be distributed to the mobile device for rendering in connection with one or more of the plurality of content items. In certain embodiments, the distributed shared content portions may be associated with metadata, timestamps, and/or other information that may be used by a mobile device to identify locations within content items where the shared content portions should be rendered in connection with the content items. In this manner, content portions shared between multiple content items may be pre-cached and/or otherwise stored by the mobile device, allowing the mobile device and/or an associated content service to prioritize downloading, streaming, and/or otherwise distributing the unique and/or otherwise not shared portions of the content items, thereby improving bandwidth utilization and/or download times.

Figure 5:
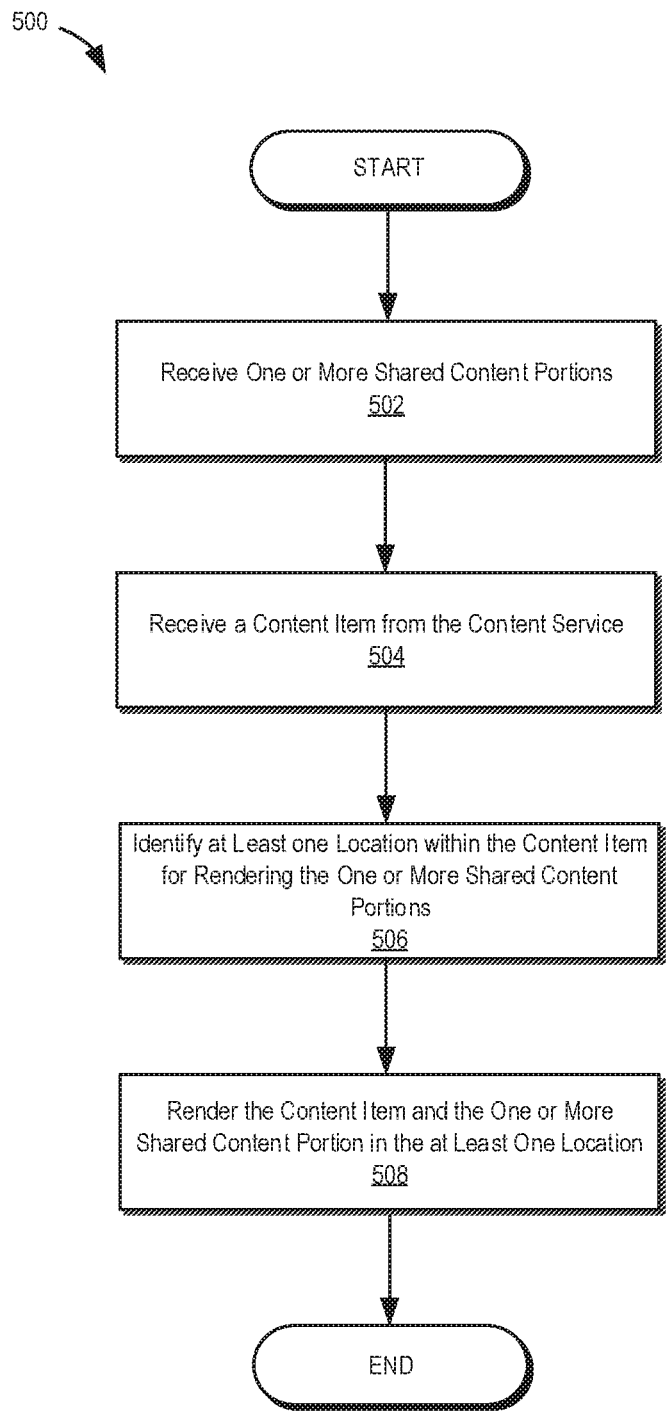
FIG. 5 illustrates a flow chart of an example of a method of rendering shared content portions consistent with certain embodiments of the present disclosure

FIG. 5 illustrates a flow chart of an example of a method 500 of rendering shared content portions consistent with certain embodiments of the present disclosure. The illustrated method 500 may be implemented in a variety of ways, including using software, firmware, and/or any combination thereof. In certain embodiments, various aspects of the illustrated method 500 and/or its one or more of its constituent steps may be performed by a content service, a user information service, a mobile device, and/or any suitable combination of one or more services and/or computer systems.

At 502, one or more shared content portions may be received by a mobile device. In some embodiments, the one or more shared content portions may comprise one or more content portions that may be shared and/or otherwise common to a plurality of content items available to the mobile device (e.g., available for download, streaming, and/or the like). As discussed above, the one or more shared content portions may comprise one or more shared pre-roll trailers, studio and/or production company introductions, copyright notices and/or infringement warnings, advertisements, and/or or any other portion of content that may be shared and/or otherwise common to a plurality of content items.

A content item may be received by the mobile device at 504. For example, the content item may be received by the mobile device as part of a download, a stream, and/or any other suitable content delivery channel and/or mechanism.

At 506, one or more locations within the received content item may be identified for rendering at least one of the one or more shared content portions received at 502. For example, in some embodiments, the content item may comprise and/or be otherwise associated with metadata, timestamps, and/or other information that may identify and/or be used by a mobile device to identify locations within the content item where a shared content portion should be rendered in connection with the content item.

The content item may be rendered at 508 with the shared content portion at the identified location. By pre-caching and/or otherwise storing shared content portions in advance, the mobile device and/or an associated content service may prioritize provisioning the device with other more unique portions of content, thereby improving bandwidth and/or network connectivity utilization.

In at least one non-limiting example, a number of content items available to a mobile device for download and/or streaming from a content service may begin with the same copyright notice. Consistent with certain disclosed embodiments, to improve bandwidth and/or network connectivity utilization, the copyright notice may be downloaded and/or otherwise pre-cached by the mobile device during periods of network connectivity. When one of the available content items is distributed to the mobile device by the content service, the content service may not need to include the copyright notice in the download, stream, and/or the like, as such information may already be cached by the mobile device, thereby prioritizing the downloading and/or streaming of the unique content items.

Figure 6:
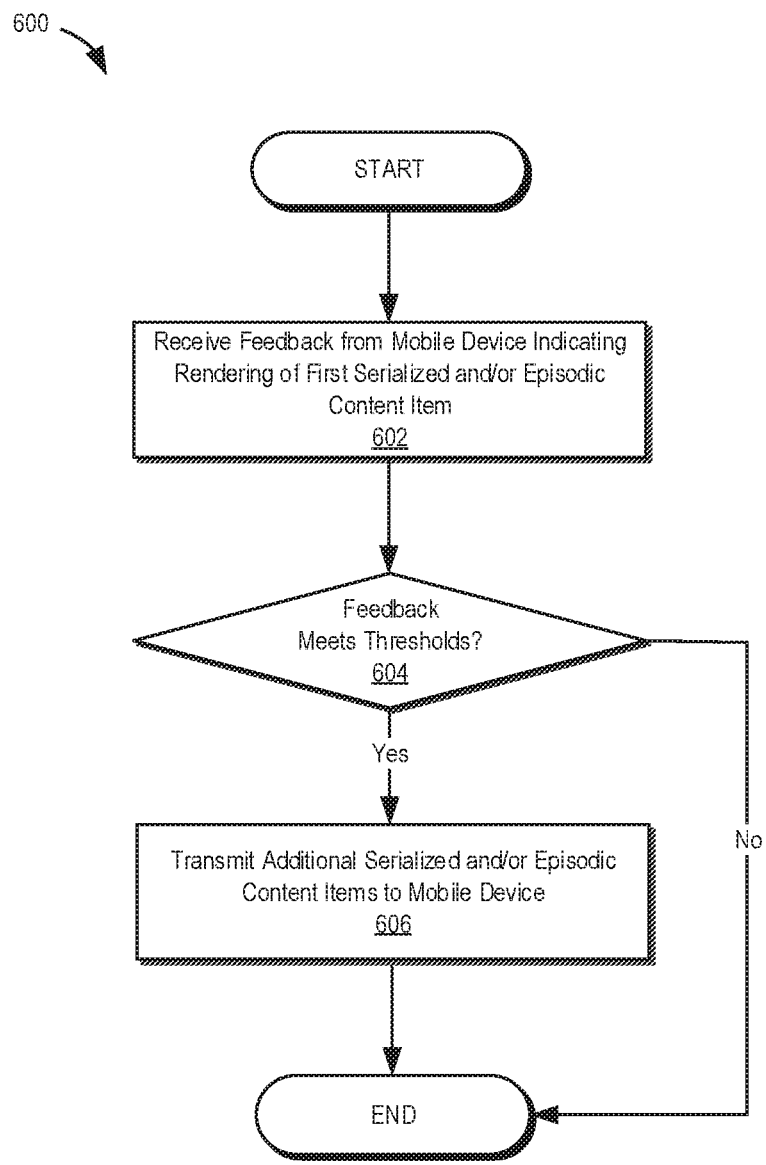
FIG. 6 illustrates a flow chart of an example of a method for distribution serialized content to a mobile device consistent with certain embodiments of the present disclosure.

FIG. 6 illustrates a flow chart of an example of a method 600 for distributing serialized content to a mobile device consistent with certain embodiments of the present disclosure. The illustrated method 600 may be implemented in a variety of ways, including using software, firmware, and/or any combination thereof. In certain embodiments, various aspects of the illustrated method 600 and/or its one or more of its constituent steps may be performed by a content service, a user information service, a mobile device, and/or any suitable combination of one or more services and/or computer systems.

In some embodiments, content items may be serialized and/or episodic. In the illustrated method 600, feedback may be received from the mobile device at 602 indicating that an associated user viewed a first content item of a serialized and/or episodic set of content items. Viewing a first content item of a serialized and/or episodic set of content items may be indicative that a user is relatively more likely to view subsequent content items in the serialized and/or episodic set of content items. For example, if a user views a first episode in a television series and/or a portion thereof, they may be more likely to view a subsequent episode and/or episodes in the television series. Similarly, if a user views two or more episodes in a television series and/or portions thereof, they may be more likely to view all the remaining episodes in the television series.

In certain embodiments, the duration that a user views a first content item of a serialized and/or episodic set of content items may be indicative that a user is relatively more likely to view subsequent content items in the serialized and/or episodic set of content items. For example, if a user views only the first three minutes of a first episode in a television series, they may be less likely to view a subsequent episode and/or all episodes in the television series than if the user were to have viewed the first thirty minutes of the first episode.

Consistent with various disclosed embodiments, a threshold in which it may be determined that a user is likely to watch a subsequent content item in a set of serialized and/or episodic content items may vary based on a relative position of a viewed content item within a sequence in the set of content items. For example, if a user views only the first three minutes of a first episode in a television series, they may be less likely to view a subsequent episode. If, however, the user views the entirety of the first episode in the television series and the first three minutes of a second episode in the series, it may be relatively likely that they will view the third and/or subsequent episodes in the television series. In this manner, the viewing threshold that may trigger a determination that the user is likely to view subsequent content items in a set of content items may vary based the relative position of viewed content within a sequence of serialized and/or episodic content items.

At 604, it may be determined whether the feedback received at 602 meets certain thresholds indicating a user is likely to view subsequent content items in a set and/or the entirely of the set. If it is determined that a user is likely to view subsequent content items, one or more content items within the serialized and/or episodic content items may be distributed to the mobile device at 606. For example, a subsequent episode and/or the entirety of a set of episodes may be distributed to the mobile device at 606 depending on the determination at 604.

Figure 7:
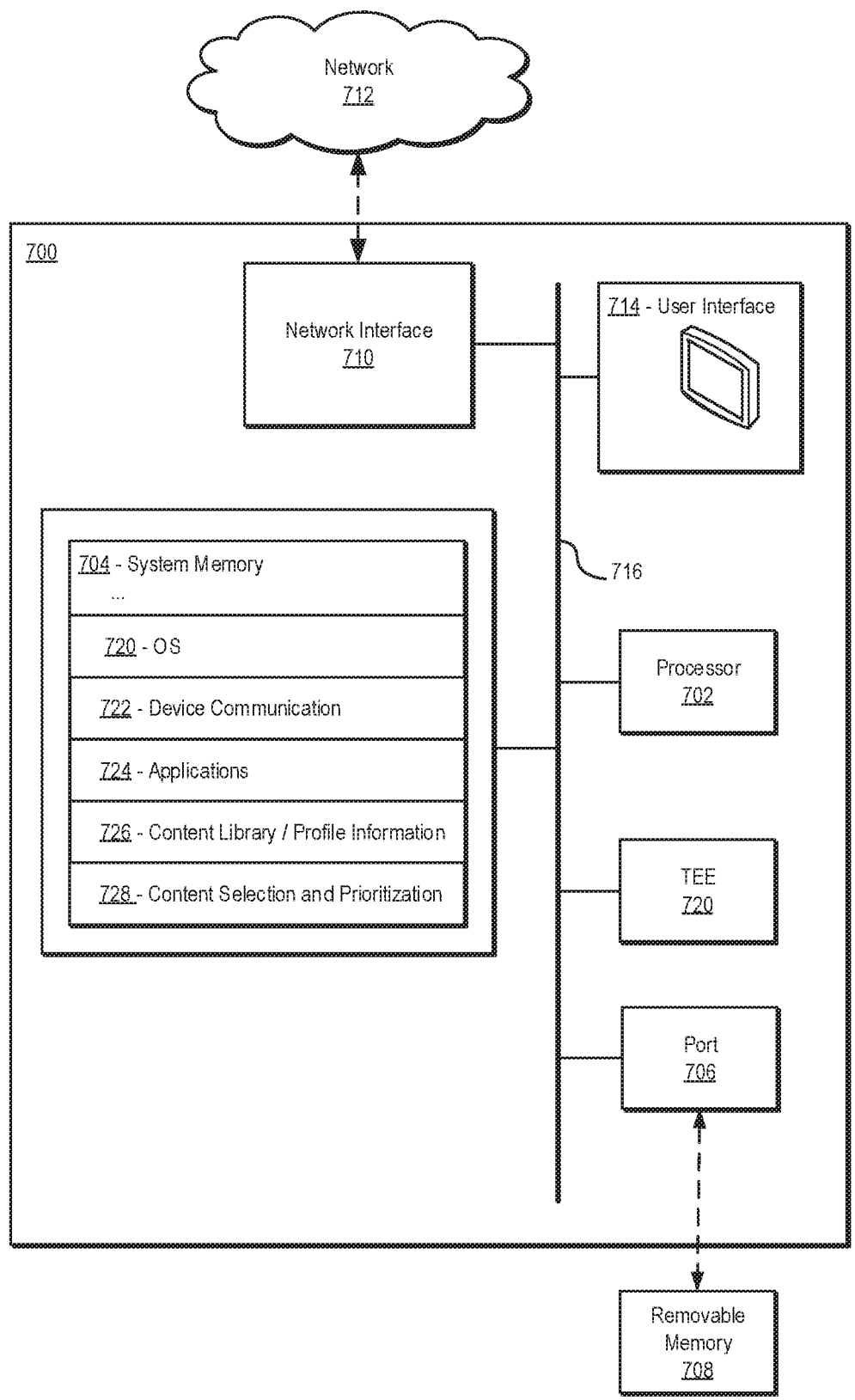
FIG. 7 illustrates an example of a system that may be used to implement certain embodiments of the systems and methods of the present disclosure.

FIG. 7 illustrates an example of a system 700 that may be used to implement certain embodiments of the systems and methods of the present disclosure. Certain elements associated with the illustrated system 700 may be included in a content service, a user information service, a mobile device, and/or any other system or service configured to implement aspects of the embodiments of the systems and methods disclosed herein.

As illustrated in FIG. 7, the system 700 may include: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 706 for interfacing with removable memory 708 that may include one or more diskettes, optical storage mediums, and/or other non-transitory computer-readable storage mediums (e.g., flash memory, thumb drives, USB dangles, compact discs, DVDs, etc.); a network interface 710 for communicating with other systems via one or more network connections 712 using one or more communication technologies; a user interface 714 that may include a display and/or one or more input/output devices such as, for example, a touchscreen, a keyboard, a mouse, a track pad, and the like; and one or more busses 716 for communicatively coupling the elements of the system 700.

In some embodiments, the system 700 may include a TEE 718 that is protected from tampering by a user of the system 700 or other entities by utilizing secure physical and/or virtual security techniques. The TEE 718 can help enhance the security of sensitive operations such user profile information management, privacy and policy management, and other aspects of the systems and methods disclosed herein. In certain embodiments, the TEE 718 may operate in a logically secure processing domain and be configured to protect and operate on secret information. In some embodiments, the TEE 718 may include internal memory storing executable instructions or programs and/or other information configured to enable the TEE 718 to perform secure operations.

The operation of the system 700 may be generally controlled by the processing unit 702 and/or the TEE 718 y executing software instructions and programs stored in the system memory 704 and/or internal memory of the TEE (and/or other computer-readable media, such as removable memory 708). The system memory 704 may store a variety of executable programs or modules for controlling the operation of the system 700. For example, the system memory 704 may include an operating system ("OS") 720 that may manage and coordinate, at least in part, system hardware resources and provide for common services for execution of various applications.

The system memory 704 may further include, without limitation, communication software 722 configured to enable in part communication with and by the system; one or more applications 724; a content library 726 comprising one or more content titles; user profile information; and/or a content selection and/or prioritization module 720 configured to perform certain content selection, prioritization, and/or distribution methods consistent with the disclosed embodiments; and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method of distributing content to a device performed by a content service system comprising a processor and a non-transitory computer-readable storage medium storing instructions that, when executed, cause the content service system to perform the method, the method comprising:

receiving a first indication from a mobile device that a user has rendered a portion of a first content item of a plurality of sequenced content items managed by the content service system, each content item of the plurality of sequenced content items comprising different content items;

determining, based on the first indication, that the rendered portion of the first content item exceeds a first threshold associated with a likelihood of the user rendering a second content item of the plurality of sequenced content items, the second content item following the first content item in the plurality of sequenced content items; and transmitting, based on determining that the rendered portion of the first content item exceeds the first threshold, the second content item to the mobile device.

2. The method of claim 1, wherein the method further comprises receiving a second indication from the mobile device that the user has rendered a portion of the second content item.

3. The method of claim 2, wherein the method further comprises determining, based on the second indication, that the rendered portion of the second content item exceeds a second threshold associated with a likelihood of the user rendering a third content item of the plurality of sequenced content items, the second threshold being lower than the first threshold.

4. The method of claim 3, wherein the third content item follows the second content item in the plurality of sequenced content items.

5. The method of claim 4, wherein the method further comprises transmitting, based on determining that the rendered portion of the of the second content item exceeds the second threshold, the third content item to the mobile device.

6. The method of claim 3, wherein method further comprises transmitting, based on determining that the rendered portion of the second content item exceeds the second threshold, a plurality of remaining content items in the plurality of sequenced content items.

7. The method of claim 1, wherein the plurality of sequenced content items comprise at least one of video content, audio content, multi-media content, and text content.

8. The method of claim 7, wherein the plurality of sequenced content items comprise episodic content items.

9. The method of claim 1, wherein second content item is associated with a content quality parameter that is higher than a content quality parameter associated with the first content item.

10. A non-transitory computer-readable storage medium storing instructions that, when executed by a processor of a content service system, cause the content service system to perform a method comprising:

receiving a first indication from a mobile device that a user has rendered a portion of a first content item of a plurality of sequenced content items managed by the content service system, each content item of the plurality of sequenced content items comprising different content items;

determining, based on the first indication, that the rendered portion of the first content item exceeds a first threshold associated with a likelihood of the user rendering a second content item of the plurality of sequenced content items, the second content item following the first content item in the plurality of sequenced content items; and transmitting, based on determining that the rendered portion of the first content item exceeds the first threshold, the second content item to the mobile device.

11. The non-transitory computer-readable storage medium of claim 10, wherein the method further comprises receiving a second indication from the mobile device that the user has rendered a portion of the second content item.

12. The non-transitory computer-readable storage medium of claim 11, wherein the method further comprises determining, based on the second indication, that the rendered portion of the second content item exceeds a second threshold associated with a likelihood of the user rendering a third content item of the plurality of sequenced content items, the second threshold being lower than the first threshold.

13. The non-transitory computer-readable storage medium of claim 12, wherein the third content item follows the second content item in the plurality of sequenced content items.

14. The non-transitory computer-readable storage medium of claim 13, wherein the method further comprises transmitting, based on determining that the rendered portion of the of the second content item exceeds the second threshold, the third content item to the mobile device.

15. The non-transitory computer-readable storage medium of claim 12, wherein method further comprises transmitting, based on determining that the rendered portion of the second content item exceeds the second threshold, a plurality of remaining content items in the plurality of sequenced content items.

16. The non-transitory computer-readable storage medium of claim 10, wherein the plurality of sequenced content items comprise at least one of video content, audio content, multi-media content, and text content.

17. The non-transitory computer-readable storage medium of claim 16, wherein the plurality of sequenced content items comprise episodic content items.

18. The non-transitory computer-readable storage medium of claim 10, wherein second content item is associated with a content quality parameter that is higher than a content quality parameter associated with the first content item.

* * * * *